US007039769B2

(12) United States Patent
Castelli et al.

(10) Patent No.: US 7,039,769 B2
(45) Date of Patent: May 2, 2006

(54) DIRECT ADDRESSED SHARED COMPRESSED MEMORY SYSTEM

(75) Inventors: Vittorio Castelli, Croton-on-Hudson, NY (US); Peter A. Franaszek, Mount Kisko, NY (US); Philip Heidelberger, Cortlandt Manor, NY (US); John Timothy Robinson, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 462 days.

(21) Appl. No.: 10/158,534

(22) Filed: May 30, 2002

(65) Prior Publication Data

US 2003/0225981 A1 Dec. 4, 2003

(51) Int. Cl.
*G06F 12/06* (2006.01)
(52) U.S. Cl. ..................... 711/147; 709/215
(58) Field of Classification Search ............... 711/142, 711/147, 153, 158, 206, 207; 710/68; 71/147, 71/153, 158, 206, 207
See application file for complete search history.

(56) References Cited

U.S. PATENT DOCUMENTS

| 4,564,903 | A | | 1/1986 | Guyette et al. | |
|---|---|---|---|---|---|
| 4,843,541 | A | | 6/1989 | Bean et al. | |
| 5,390,299 | A | * | 2/1995 | Rege et al. | 709/234 |
| 5,627,995 | A | * | 5/1997 | Miller et al. | 711/171 |
| 5,729,228 | A | | 3/1998 | Franaszek et al. | |
| 5,761,536 | A | | 6/1998 | Franaszek | |
| 5,864,859 | A | | 1/1999 | Franaszek | |
| 5,909,638 | A | * | 6/1999 | Allen | 725/146 |
| 6,349,372 | B1 | * | 2/2002 | Benveniste et al. | 711/159 |
| 6,446,145 | B1 | * | 9/2002 | Har et al. | 710/68 |
| 2003/0061457 | A1 | * | 3/2003 | Geiger et al. | 711/165 |

FOREIGN PATENT DOCUMENTS

| JP | 62169258 | 7/1987 |
|---|---|---|
| JP | 63071744 | 4/1988 |

(Continued)

OTHER PUBLICATIONS

P.A. Franaszek, et al., Algorithms and Data Structures for Compressed-Memory Machines, IBM J & Dev. vol. 45 No. 2, Mar., 2001, pp. 245-258.

*Primary Examiner*—Donald Sparks
*Assistant Examiner*—Jared Rutz
(74) *Attorney, Agent, or Firm*—F. Chau & Associates, LLC

(57) ABSTRACT

In a computer system in which a plurality of hosts is connected through an interconnection network, an apparatus coupled to the interconnection network for allowing the plurality of hosts to share a collection of memory sectors, the memory sectors storing compressed data, is provided. The apparatus includes a network adapter for coupling the apparatus to the interconnection network; a memory for storing the collection of memory sectors; and control logic for managing the memory, the control logic including a memory compressor/decompressor. The memory further includes a directory for translating real addresses of at least one host to an address in the apparatus. A method for managing a number of memory sectors used by each host and a method for translating a real address specified by at least one host into a real address of the apparatus is also provided.

35 Claims, 12 Drawing Sheets

FOREIGN PATENT DOCUMENTS

| | | |
|---|---|---|
| JP | 01191244 | 8/1989 |
| JP | 03068044 | 3/1991 |
| JP | 03097049 | 4/1991 |
| JP | 04238556 | 8/1992 |
| JP | 10133893 | 5/1998 |
| JP | 00227874 | 8/2000 |
| JP | 00250766 | 9/2000 |
| JP | 00347935 | 12/2000 |
| JP | 01092796 | 4/2001 |
| JP | 02024082 | 1/2002 |
| JP | 02132582 | 5/2002 |

* cited by examiner

DIRECT ADDRESSED SHARED COMPRESSED MEMORY SYSTEM

BACKGROUND OF THE INVENTION

1. Field of the Invention

This invention relates to computer architecture, and more particularly, to a network-connected apparatus that allows multiple hosts to share a collection of memory sectors, in which the memory sectors are used to store compressed data. The apparatus will hereinafter be referred to as a "direct addressed Shared Compressed Memory System" (SCMS).

The invention includes methods for translating real addresses generated by the hosts into real addresses as managed by the SCMS, which are then translated into physical addresses by the compressed-memory management system; methods for ensuring memory content protection; mechanisms for sharing the content of memory among different hosts; methods for distributing a contiguous portion of the real address space of a host across multiple SCMSes; and methods for ensuring that each host can be guaranteed a certain number of memory sectors.

2. Description of the Related Art

An emerging development in computer organization is the use of data compression in a computer system's main memory. Real memory, namely, the set of processor addresses that correspond to data stored in memory, is typically divided into a number of pairwise disjoint segments corresponding to a fixed number of contiguous processor addresses. By pairwise disjoint, it is meant that each real address belongs to one and only one such segments. These segments are referred to as memory lines. Memory lines are the unit of compression. A memory line stored in the compressed memory is compressed and stored in a variable number of memory locations, which depends on how well its content compresses. International Business Machines (IBM) Corporation has several patents related to computer systems where the contents of main memory are compressed. Examples of such systems are disclosed in U.S. Pat. No. 5,729,228 entitled "Parallel compression and decompression using a cooperative dictionary" issued to Franaszek et al. on Mar. 17, 1998; U.S. Pat. No. 5,761,536 entitled "System and method for reducing memory fragmentation by assigning remainders to share memory blocks on a best fit basis" issued to Franaszek on Jun. 2, 1998; and U.S. Pat. No. 5,864,859 entitled "System and method of compression and decompression using store addressing" issued to Franaszek on Jan. 26, 1999.

FIG. 1 depicts an exemplary system having such data compression features. In FIG. 1, a central processing unit (CPU) 102 reads data to and writes data from one or more caches 104. Cache misses and stores result in reads from and writes to a compressed main memory 110 by means of a compression controller 106. The compressed main memory 110 is divided into two parts: a data portion 108 and a directory 107 (also known as a compression translation table CTT). The data portion 108 is divided into pairwise disjoint sectors, i.e., fixed-size intervals of physical memory locations. For example, a sector might consist of 256 physical bytes having contiguous physical addresses. The content of a compressed memory line is stored in the minimum possible number of physical sectors. The physical sectors containing a compressed line need not have contiguous physical addresses, and can be located anywhere within the data portion 108 of the compressed main memory 110. The translation between the real address of a byte and the address of the physical sector containing it is performed via the directory or CTT 107.

FIG. 2 contains further details to better understand the operation of the compressed memory 210. A processor cache 240 contains uncompressed cache lines 241 and a cache directory 242, which stores the real address of each cache line. For the purpose of illustration, it will be assumed that a cache line has the same size as a memory line (the unit of compression). Upon a cache miss, the cache requests the corresponding line from memory, by providing real address 270 that caused the miss. The real address is divided into two parts: the $\log_2$(line length) least significant bits which are the offset of the address within the line, where $\log_2(\ )$ is the logarithm in base 2, and the remaining bits which are used as an index in the directory 220, which contains a line entry for each line in the supported real address range. In FIG. 2, address A1 (271) corresponds to line entry 1 (221), address A2 (272) corresponds to line entry 2 (222), address A3 (273) corresponds to line entry 3 (513) and address A4 (274) corresponds to line entry 4 (514). Different addresses are used in the example to show different ways of storing compressed data in the compressed main memory. In this example, the line having address A1 compresses very well (for example, a line consisting of all zeros). Such a line is stored entirely in the CTT entry 221, and does not require memory sectors. The line at address A2 compresses less well, and requires two memory sectors 231 and 232, which are stored in the data section 230. Line entry 222 contains pointers to the memory sectors 231 and 232. Note that the last part of memory sector 232 is unutilized. The line having address A3 requires 3 memory sectors, 233, 234 and 235. The space left unutilized in sector 235 is large enough to store part of the compressed line having real address A4, which in turn uses sector 236 and part of 235. The lines at addresses A4 and A3 are called roommates.

Compressor 261 is used when dirty lines in the cache are written back into memory. Upon a cache writeback, a dirty line is compressed. If it fits in the same amount of memory it used before the writeback, it is stored in place. Otherwise, it is written in the appropriate number of sectors. If the number of required sectors decreases, the unused sectors are added to a free-sector list. If the number of required sectors increases, they are retrieved from the free-sector list.

FIG. 3 shows possible organizations of the entries in the directory or CTT 220. Three different line organizations are illustrated. Entry 1 (306) contains a set of flags (301), and the addresses of 4sectors. If the line size is 1024 bytes, and the memory sector size is 256, the line requires at most 4 sectors. Entry 2 (307) contains a set of flags, the address of the first sector used by the line, the beginning of the compressed line, and the address of the last sector used by the line. If the line requires more than 2 memory sectors, the sectors are connected by a linked list of pointers (namely, each memory sector contains the address of the subsequent one). Entry 3 contains a set of flags, and a highly compressed line, which compresses to 120 bits or less. The flags in the example can be flag 302 indicating whether the line is stored in compressed format or uncompressed; flag 303 indicating if the line is highly compressible and is stored entirely in the directory entry; flag 304 (2 bits) indicating how many sectors the line uses; and flag 305 (4 bits) containing the fragment information, namely what portion of the last used sector is occupied by the line (this information is used for roommating). The maximum compression ratio achievable in a system with memory compression that relies on the above-described compressed-memory organization depends on the size of the directory, i.e., the maximum number of real addresses is equal to the number of directory entries in the directory.

In a related field, methods for partitioning an uncompressed memory are taught, for example, by R. R. Guyette, et al., in U.S. Pat. No. 4,564,903 entitled "Partitioned multiprocessor programming system". This patent teaches a control method for a multiprocessor (MP) system having plural CPUs sharing a main storage (MS) and I/O processing means for connecting a plurality of I/O devices to MS, the control method enabling the MP to execute a uniprocessor programming system (UPS) simultaneously on plural CPUs in the MP, even though the UPS is designed to only execute on a uniprocessor (UP) system having the same or a different architecture than the MP. This patent teaches apparatus and methods for a non-compressed memory contained within the MP system. However, it does not teach apparatus and methods for a compressed memory system that is not part of the MP system, nor for a compressed memory that is shared by different computer systems and that is not part of any of the computer systems.

Partitioning is also taught, for example, in U.S. Pat. No. 4,843,541 entitled "Logical resource partitioning of a data processing system" issued to G. H. Bean, et al. on Jun. 27, 1989. This patent teaches a method of restricting guest operations in a data processing system to system resources assigned to a guest, the resources in the system including one or more real CPUs, a system main storage (MS), an optional system extended storage (ES), and a plurality of I/O channels using I/O processors for connecting to the system a plurality of I/O device control units with their I/O devices, a host hypervisor (host) which includes software, the host supervising plural software control programs (guests) capable of concurrently and independently operating in the system and the guests may be the same or different types of control programs, subchannels (SCHs) for representing I/O devices to the host and to the guests, each guest being restricted to using an assigned subset (partition) of system resources. However, the patent does not teach sharing a network-attached compressed memory among different hosts.

Partitioning as taught in the art comprises methods for translating real addresses as seen by software components running on a computer into real addresses as managed by the computer. These software components can be multiple images of the same operating system, or of different operating systems, and therefore they can perform logical-to-real address translation. Partitioning treats the real addresses produced by these software components as logical addresses, and performs a further logical-to-real translation. If the hardware does not support memory compression, real addresses are equivalent to physical addresses. However, if the memory is compressed, real addresses are not equivalent to physical addresses, and a further translation is necessary. Conventional partitioning also includes protection mechanisms that prevent software components running in a specific partition from accessing the content of memory of software components running in the other partitions.

However, partitioning as taught in the art does not address how to provide sharing of memory resources, as well as security mechanisms, within devices that are physically separate from the computer systems where the software component using the data are executed, so that the sharing and security mechanisms are not controlled by the computer systems, and are in fact transparent to such computer systems.

SUMMARY OF THE INVENTION

In a computer system where multiple hosts are connected through a network, the present invention provides network-connected apparatuses that are also connected to the network and that provide the functionality of extending the logical real memory of the hosts and maintaining the content of their memory in compressed form. The network-connected apparatus of the present invention is a direct addressed Shared Compressed Memory System (hereinafter referred to as a SCMS). SCMSes divide their internal real memory space into adjacent real address ranges, called segments, and their physical memory into a common pool of adjacent physical address ranges, called sectors. Hosts can allocate segments from these devices, and address their content as they address their internal memory, namely, through a real address. The SCMS translates the memory address provided by the hosts into an internal real address, which is translated by the compressed memory directory (CTT) into the physical addresses of the sectors where the compressed data is actually stored. Segments are dynamically associated with a variable number of physical sectors. When the compressibility of the data stored within a segment decreases, the number of physical sectors associated with the segment increases, and vice versa. This invention specifically provides apparatuses and methods for managing the assignment of physical sectors from the common pool to the memory segments, which would not be present in similar devices not supporting memory compression, nor in regular computers supporting memory compression.

According to an embodiment of the present invention, in a computer system in which a plurality of hosts is connected through an interconnection network, an apparatus coupled to the interconnection network for allowing the plurality of hosts to share a collection of memory sectors, the memory sectors storing compressed data, is provided. The apparatus includes a network adapter for coupling the apparatus to the interconnection network; a memory for storing the collection of memory sectors; and control logic for managing the memory, the control logic including a memory compressor/decompressor. The memory further includes a directory for translating real addresses of at least one host to an address in the apparatus.

In another embodiment, the control logic of the apparatus further includes a matrix of registers, each row of the matrix corresponding to a different host id and each column corresponding to a different segment number whereby contents of a specific register determined by the id of the at least one host and desired segment is concatenated to the offset resulting in the real address of the apparatus.

In a further embodiment, the control logic of the apparatus includes an array of registers, the array including a number of registers corresponding to a number of segments of the apparatus, wherein each register comprises one bit for each supported host, whereby if the one bit is equal to 1, a desired segment is concatenated to the offset resulting in the real address of the apparatus, and if the one bit is equal to 0, the at least one host being denied access to the segment.

In a further embodiment of the present invention, the control logic of the apparatus includes an associative memory including one row for each managed segment of the apparatus, a first column including keys and a second column including values, wherein the keys are starting real addresses provided by the plurality of hosts for desired segments and the values are starting real addresses of segments in the apparatus whereby a value determined by a search key of the at least one host is concatenated to the offset resulting in the real address of the apparatus.

According to another embodiment, a computer system is provided including a host connected through an interconnection network; and a plurality of apparatuses, each apparatus including a collection of memory sectors, the plurality of apparatuses coupled to the interconnection network for allowing the host to share a collection of memory sectors among the plurality of apparatuses, the memory sectors storing compressed data. A contiguous subset of real addresses of the host is distributed across the plurality of apparatuses.

In yet another embodiment of the invention, in a computer system in which a plurality of hosts is connected through an interconnection network including an apparatus coupled to the interconnection network for allowing the plurality of hosts to share a collection of memory sectors, the memory sectors storing compressed data, a method for managing a number of memory sectors used by each host is provided. The method includes the steps of determining a maximum number of sectors to be granted to each host; allocating to at least one host a threshold register for storing a maximum number of sectors granted to the at least one host; allocating to the at least one host a counter register for storing a number of sectors used by the at least one host; and comparing a value of the threshold register of the at least one host to a value of the counter register of the at least one host to determine if the value of the counter register has exceeded the threshold register.

The method further includes the steps of, if the value of the counter register has exceeded the threshold register, preventing a write operation by at least one host and notifying each such host or hosts that the write operation failed.

According to a further embodiment of the present invention, in a computer system in which a plurality of hosts is connected through an interconnection network including an apparatus coupled to the interconnection network for allowing the plurality of hosts to share a collection of memory sectors, the memory sectors storing compressed data, a method for translating a real address specified by at least one host into a real address of the apparatus is provided. The method including the steps of requesting by the at least one host a desired real address of the apparatus using a host-specified real address; identifying a data holding location in the apparatus using the host-specified real address; determining a first value using contents of the data holding location; and concatenating the first value to an offset resulting in the real address of the apparatus.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF PREFERRED EMBODIMENTS

The description of the preferred embodiments of the present invention assumes that the network's operating system is a paged operating system, like Windows95, Windows98, Windows NT, Windows2000, Linux, AIX and all the other versions of UNIX, Mac OS, IBM OS/400 etc. One of ordinary skill in the art will readily appreciate how the present invention could be adapted to non-paged operating systems.

In a paged operating system, the virtual address space, namely, the collection of addresses addressable by a program, is divided into pages, which are collections of contiguous virtual addresses, having fixed lengths. Typically a page contains 4 KB. The virtual address space of a program may be much larger than the available physical memory. The operating system provides a set of functionalities supporting this feature, functionalities that are collectively referred to as virtual memory manager. To support virtual address spaces larger than the physical memory, virtual memory managers store virtual pages both in memory and on tertiary store, usually hard disks. When a virtual page is accessed, and is not in main memory, it is read from the disk (page-in operation). If there is no available physical space for the page being read from the disk, another virtual page is written to the disk (page-out operation) and its space is released. When a virtual page is read from the disk, it is assigned a starting real address (namely, an address as seen from the processor). The real memory (the address space of the processor) is divided into a collection of contiguous and pairwise disjoint real address ranges, having the same size as a logical page. These are called page frames. Hence, when a logical page is read from memory, it is stored within a page frame. The translation between logical and real pages relies on a directory structure divided into pages called page tables. Each logical page has a unique entry in a page table, called page table entry, which contains the starting real address of the page frame containing the page, or the position on the disk, if the logical page is on tertiary store. Free page frames are managed using a separate data structure, called (in Windows NT and 2000) page frame number database.

Figure 1:
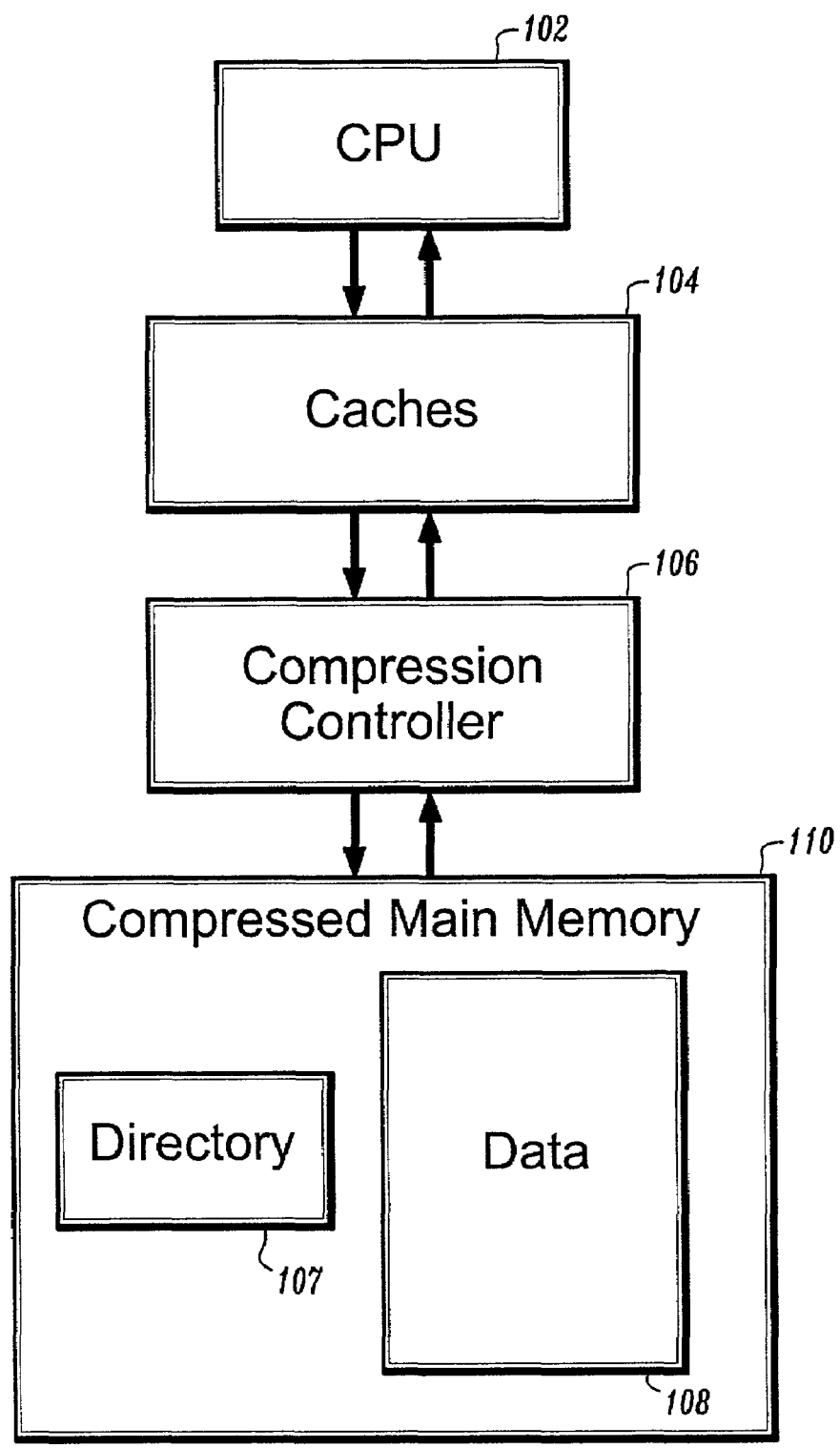
FIG. 1 illustrates a structure of a conventional computer system supporting compressed main memory.
Figure 2:
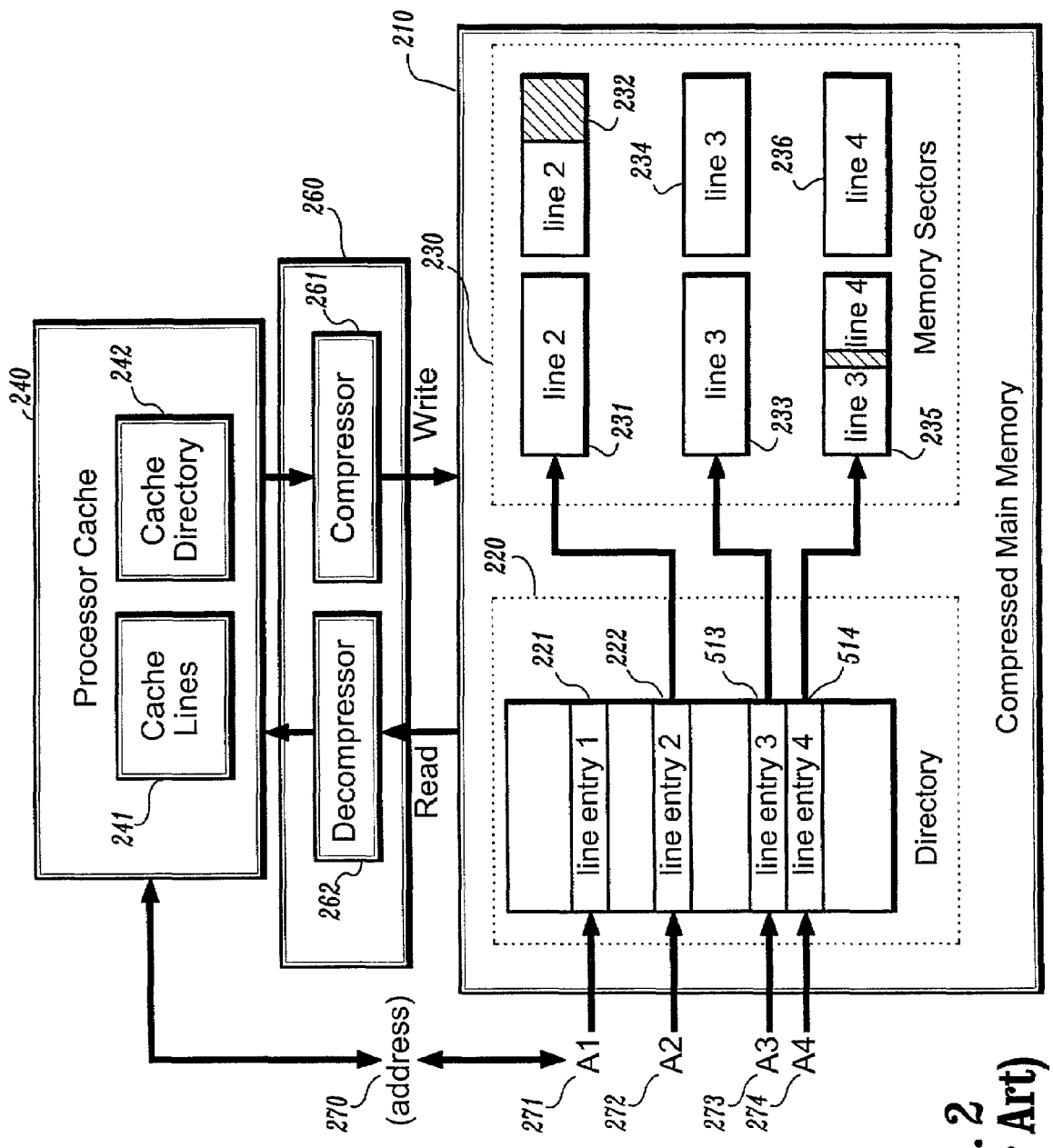
FIG. 2 illustrates a detailed structure of a memory system of the conventional computer system supporting compressed main memory shown in FIG. 1.
Figure 3:
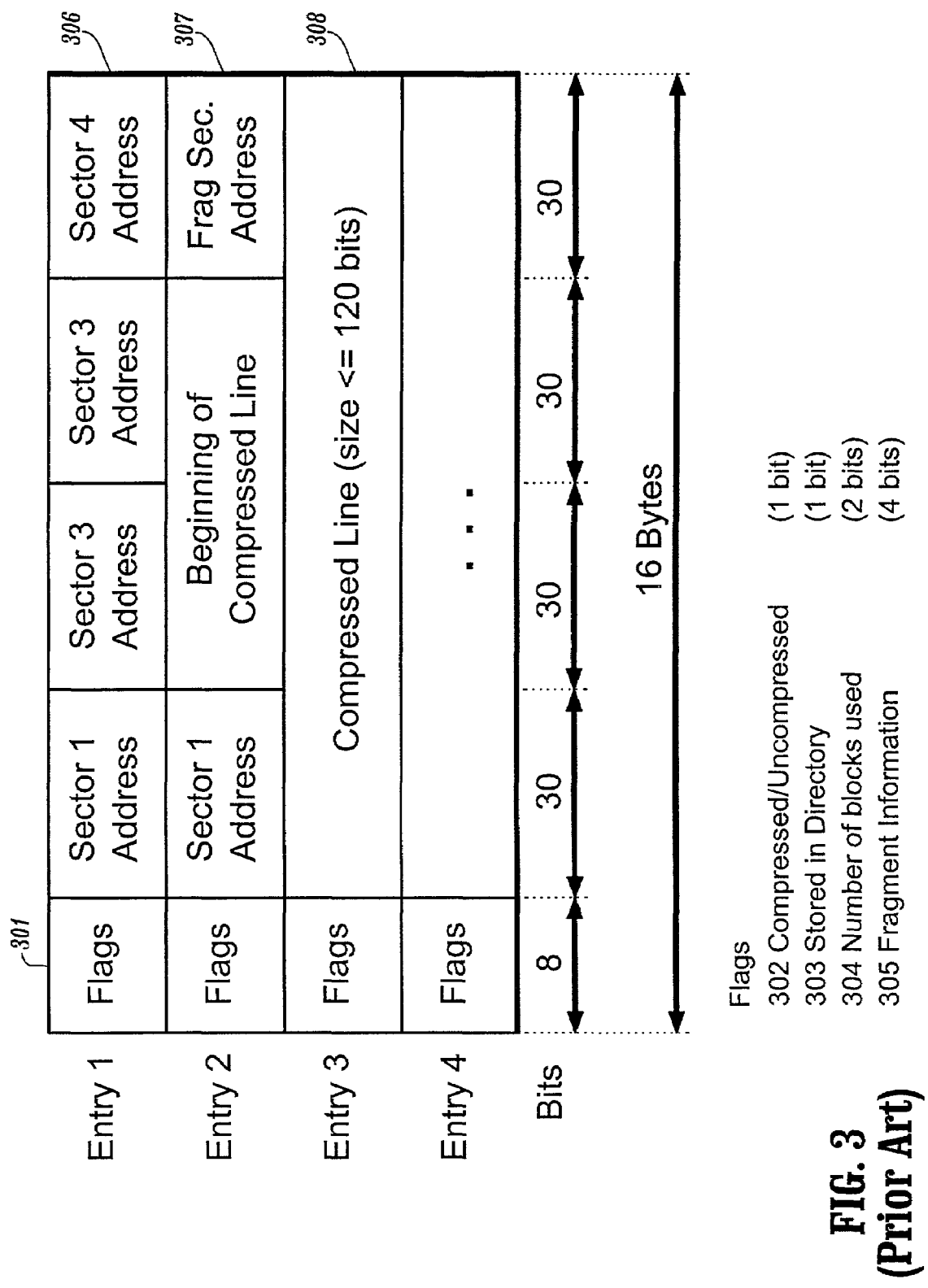
FIG. 3 illustrates a structure of a memory directory in the conventional computer system supporting compressed main memory shown in FIG. 1.
Figure 4:
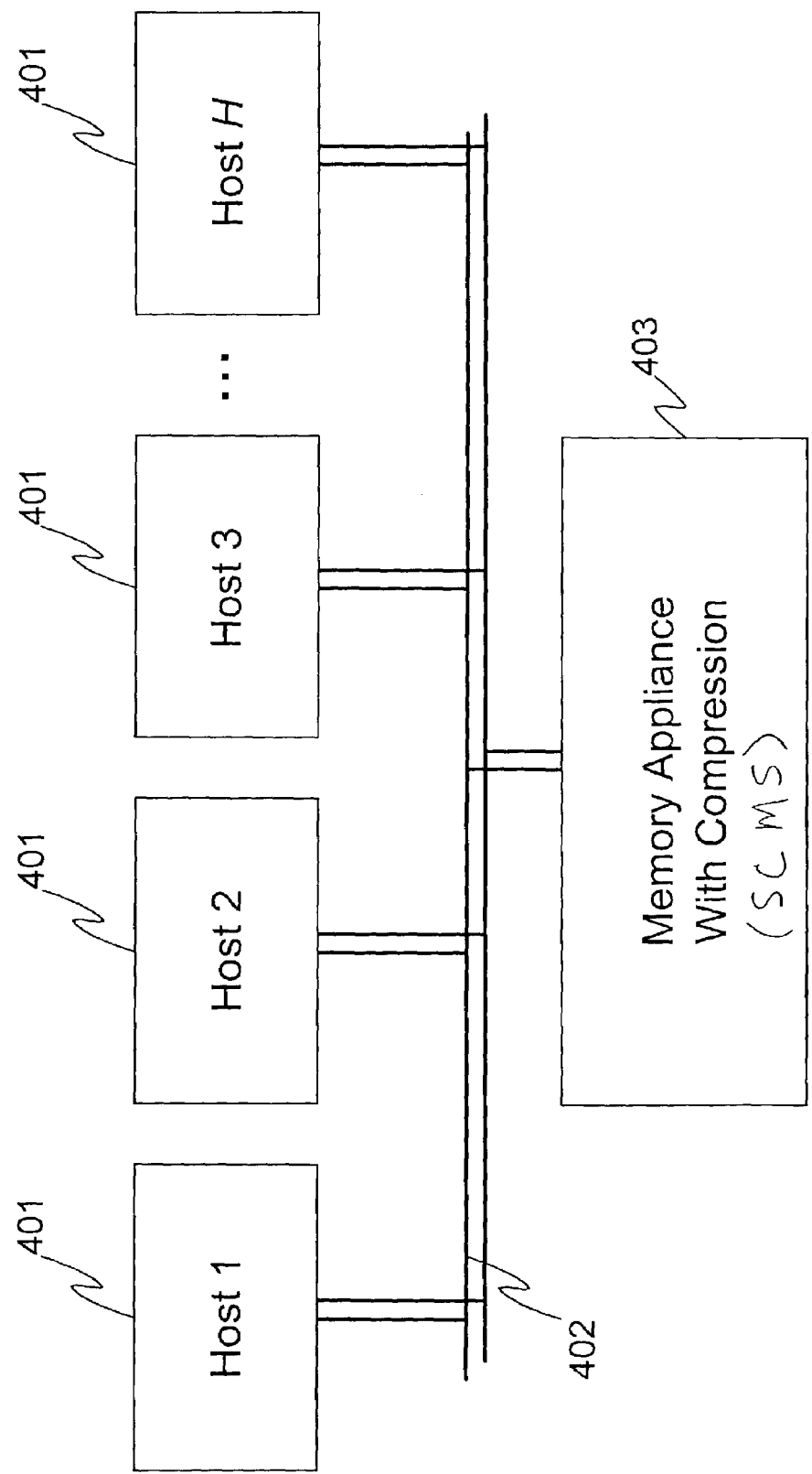
FIG. 4 illustrates an architecture of a network utilizing a direct addressed Shared Compressed Memory System (SCMS) in accordance with the present invention.

FIG. 4 shows the architecture of a network having features of the present invention. A plurality of computer hosts 401 is connected to a SCMS (direct addressed Shared Compressed Memory System) 403 supporting memory compression via an interconnection network 402. Computer hosts 401 could be, for example, personal computers, workstations, Symmetric Multiprocessor (SMP) machines, non-uniform memory access machines (NUMA), Cache-only machines (COMA), storage servers, SP nodes, etc.

The SCMS 403 supports memory compression, and provides the services necessary for the computer hosts 401 to share a collection of free memory sectors, including memory compression/decompression, translation between real addresses and physical addresses, protection (e.g., it prevents one host from accessing the memory sectors allocated to a different host), load balancing, performance isolation (i.e., minimizes the impact of the behavior of one of the hosts 401 on the others), etc.

Figure 5:
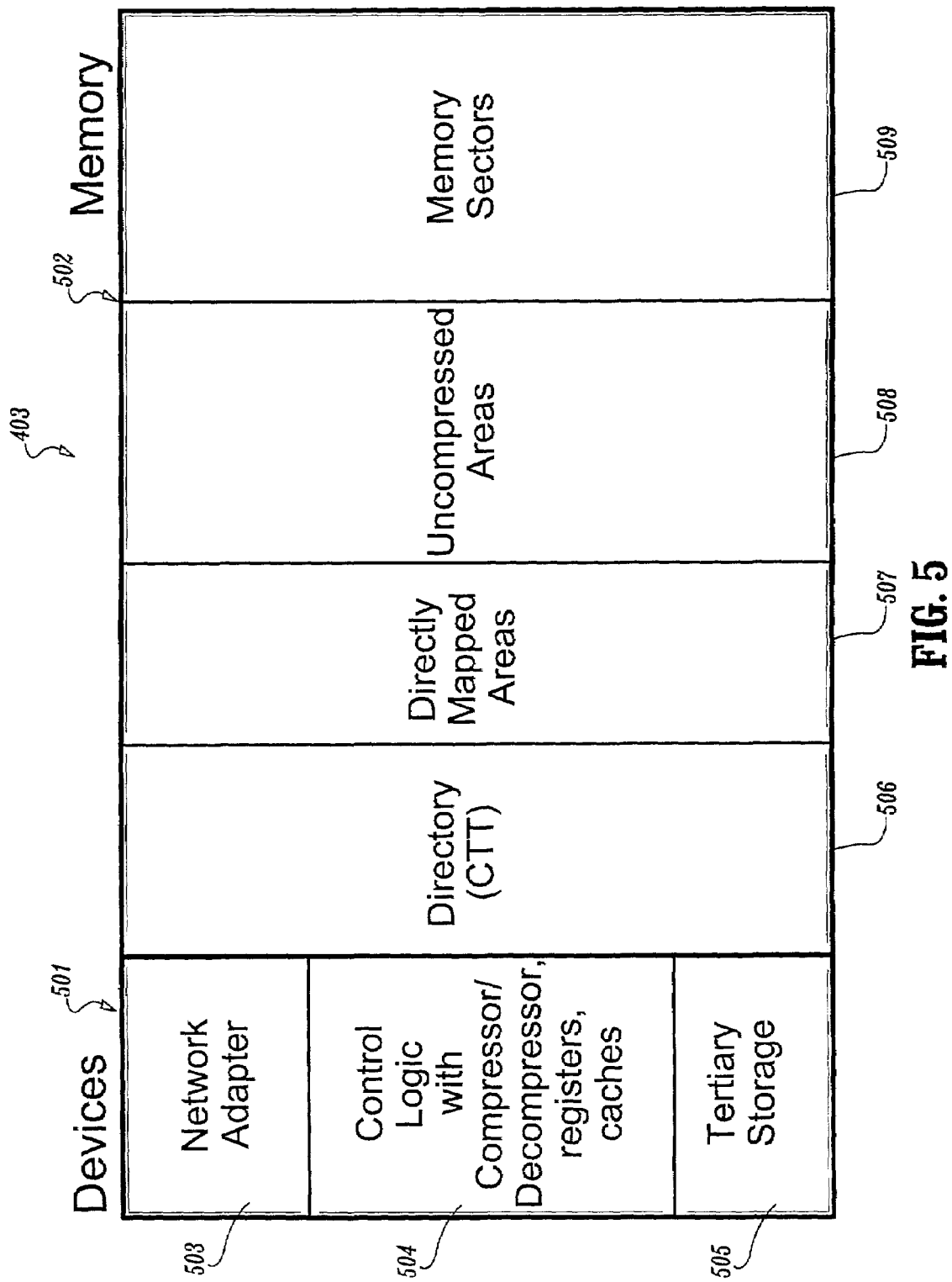
FIG. 5 illustrates a block diagram of the SCMS in accordance with the present invention.

FIG. 5 shows a general architecture of the SCMS 403. The SCMS 403 includes a collection of devices 501 and memory 502. The collection of devices 501 includes a network adaptor 503, control logic 504 for the management of the memory 502, and tertiary store 505. The control logic 504 for the management of the memory 502 further comprises a memory compressor/decompressor, registers, caches to contain directory or CTT entries, circuitry to address, read and write from memory, buffers, etc. The tertiary store 505 includes ROM, EPROM, FLASH memory cards, and hard disks. In a preferred embodiment, SCMS 403 also shares one or more hard disks with one or more of the hosts 401.

The memory 502 is logically divided into a memory directory area 506 (also known as a compression translation table and hereinafter referred to as CTT), a directly mapped area 507 (where, for instance, addresses are computed as an offset from a register), an uncompressed area 508, and a pool of memory sectors 509, as described above. In the spirit of the present invention, each of these areas need not span an address range, but can be spread over multiple address ranges, in which case each such area can also be considered as a plurality of areas.

In a preferred embodiment, the SCMS 403 operates as an extension of the real memory space of the hosts 401. More specifically, the hosts 401 can instruct the SCMS 403 to serve a range of real addresses. When the host 401 needs to access (read or write) memory locations within the range of real addresses, it asks the SCMS 403 to perform the desired operations. In a preferred embodiment, in order to keep the complexity of the hardware of the SCMS reasonable, the memory 502 can serve up to H different hosts. Hosts desiring to use the SCMS, register with it and if the SCMS is currently serving less than H hosts, it assigns to the requesting host a unique id, for example, between 0 and H-1, and the registration process is complete.

In a preferred embodiment, the hosts 401 can allocate real memory address ranges within the SCMS at a predefined granularity, namely, in units containing a fixed number of contiguous real addresses, which is henceforth referred to as segments. The segment size is denoted by L, and the number of segments supported by the SCMS is denoted by S. For example, consider a SCMS supporting 32 Gb of real memory where H=16 and L=1 Gb. In this example, the real memory space served by the SCMS is divided into 32 segments, and each host 401 can therefore allocate between 1 and 17 segments (when the remaining H-1 hosts use only 1 segment). In an embodiment, the SCMS limits the number of segments that an individual host can allocate to a maximum value N, in order to prevent one host from overly affecting the performance of the other hosts by using too many resources. For example, the SCMS could limit the number of segments used by a host to 8. Hosts can request segments from the SCMS, and, if segments are available and the host has not reached its segment limit, it is granted a segment. Hosts can also release segments, which are then added to a pool of free segments.

In a preferred embodiment, when a host allocates a memory segment, the SCMS notifies the host of the corresponding real address range. In this embodiment, assuming 64-bit addressing, the $\log_2(H)$ most significant bits of the address are the host id; in the example, where H=16, the 4 most significant bits identify the host. The following $\log_2(N)$ bits (3 in the example) identify the segment containing the addresses, while the $\log_2(L)$ least significant bits (30 in the example) are the offset within the segment. This scheme does not specify the value of a large number of address bits (27, in the example). These can be used, for example, if a host 401 is registered with multiple SCMSes and assigned the same id. In this case, the non-specified bits can be used to differentiate between segments allocated in different SCMSes, as will be described below.

As described above, the translation between real addresses and physical addresses in a system supporting memory compression relies on a directory called CTT. In the spirit of the present invention, the SCMS CTT 506 is divided into contiguous parts, each of which is used to perform the real-to-physical translation for one of the segments. The number of contiguous parts is therefore equal to the maximum number of segments managed by the SCMS, and the size of each contiguous part is such that it contains the number of CTT-entries needed to address a segment. In a preferred embodiment, the size of the CTT is determined at initial program load IPL (i.e., while the machine boots). For example, if the SCMS contains 16 Gb of physical memory and supports 32 Gb of real memory, and the unit of compression is 1K, the CTT will contain $32 \times 2^{20}$ entries, and is divided into 32 contiguous parts, each of which contains $2^{20}$ entries corresponding to a different segment.

A feature of the present invention which is not found in regular computers supporting memory compression, devices providing the functionality of memory servers, or devices not supporting memory compression, is hardware and/or software components necessary to support policies controlling how much physical memory each host uses. This feature is described with reference to FIG. 6. When a host requests a segment, it may also request a number of physical sectors that can be interpreted as a guaranteed number of physical sectors allocated, or reserved, to the segment. If the total number of reserved sectors does not exceed the total number of sectors, the request can be granted.

The SCMS contains a set of registers containing thresholds 601 and counters 602. The maximum number of physical sectors granted to each host is stored in a unique threshold register, and the number of physical sectors used by the host is stored in a unique counter register. When a write or release memory operation is issued by a host, its host id 603 is used to select the associated threshold and counter. If the operation is a release, the counter is decremented by the number of physical sectors used by the set of real addresses released by the host. If the operation is a write, the compressor/decompressor (604) reduces the counter by the number of physical sectors used before the write operation by each memory line affected by the write operation. The compressor then compresses each line, and increments the counter by the number of physical sectors used by the line. A comparator 605 compares the value of the threshold with the value of the counter. When the value exceeds the threshold, the comparator 605 produces a comparison result 606 indicating that the host has exceeded its allocated quota of physical sectors. Otherwise, the comparator produces a comparison result indicating that the threshold has not been exceeded.

The comparison result 606 is used by a (software or hardware) mechanism to signal a host (or hosts) when its number of used segments exceeds a threshold; the threshold can be software set to be near, but less than, the reserved sectors counter. This allows a mechanism whereby a host can reduce its use of sectors as it approaches its limit. In the event that a host does not successfully reduce its sectors, a situation may arise in which a store operation (write) by a host to the SCMS may result in its used sectors exceeding its reserved sectors. In such a case, several options are available:

(1) The SCMS may prevent the write operation from completing and signal an error to the host. This prevents subsequent writes from that host, say host 0, from being satisfied until such time as the number of used sectors drops below the threshold value. In addition, it permits the other hosts to continue operating, no matter how badly the compression ratio of host 0 degrades.

(2) The SCMS may satisfy the write operation, assuming a sufficient number unused sectors are still available in the SCMS. The SCMS would also signal another error to the host, which can be interpreted as a high priority message to reduce its sector usage. In this case, other hosts may continue to operate, however, there is the exposure that they may eventually run out of sectors if host 0's compression ratio continues to degrade.

Figure 7:
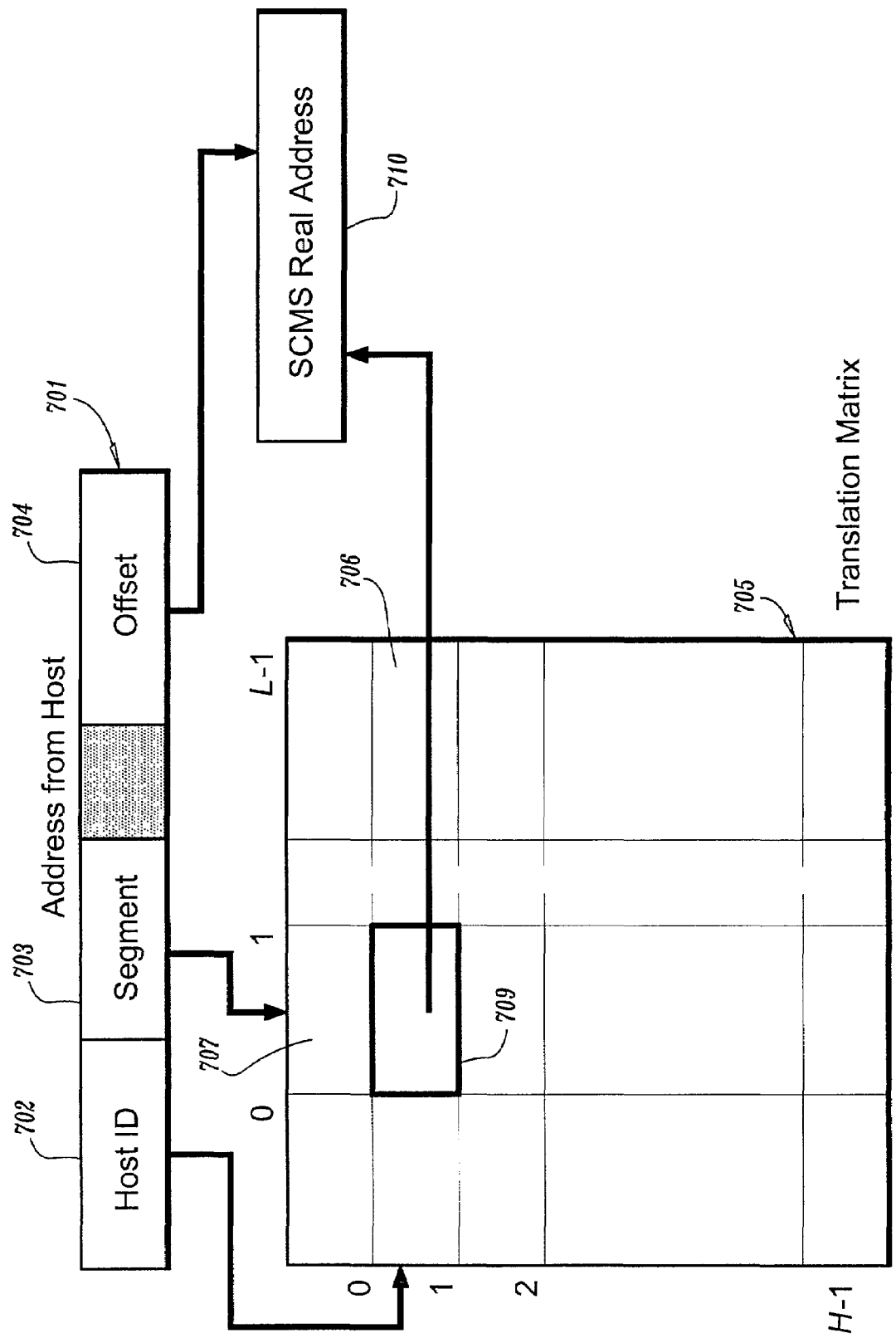
FIG. 7 illustrates a method for translating addresses from a host into real addresses as managed by the SCMS, which relies on a translation matrix.

FIG. 7 shows a preferred embodiment of the translation of how a real address specified by a host is translated into a SCMS real address. The host-specified real address 701 is decomposed into host id 702, segment number 703 and offset 704, with some bits being ignored. The control logic 504 of the SCMS, as shown in FIG. 5, contains a matrix of registers 705, i.e. data-holding locations. Each row of the matrix 705 corresponds to a different host id, hence the matrix 705 contains H rows. Each column of the matrix corresponds to a different segment number, and therefore the matrix contains L columns. The host id 702 is used to select row 706 of the matrix, and the segment number 703 is used to select column 707. Column 707 and row 706 together uniquely identify register 709. The content of register 709, namely, the starting point of the part of the CTT used to address the desired segment, is combined with the offset 704 in a register 710 outside the matrix 705, by concatenating the bits contained in register 709 to the offset bits 704. Register 710 now contains the SCMS real address, in other word, the real address of the desired data as managed by the memory 502.

In a different embodiment, the host id is not part of the address, but is obtained, for example, from the network adapter. In this embodiment, which will be described with reference to FIG. 8, a predefined part 802, namely a segment number, of the address 801 provided by the host 401 is used to specify the desired segment (thus, this part is $\log_2(S)$ bits long), while the least significant bits 803 of the address 801 are the offset. One of ordinary skill in the art would appreciate that prespecified position of the part 802 of the address 801 containing the segment number need not consist of adjacent bits, and that these bits can be placed anywhere in the address 801 except for the part used by the offset 803. The host id 805 is provided separately from the desired address. The control logic 504 of the SCMS, as shown in FIG. 5, contains an array of registers 804 (data-holding locations) with one register per segment, each register containing one bit per each supported host. When a host allocates a segment, it specifies which hosts can read and write to the segment, by setting the corresponding bits in the register to '1', while the remaining are set to '0'. Upon a read/write operation, the segment number 802 is used to select a register in the register array 804, and the bit of the entry corresponding to the host id 805 is checked. If the bit is set to '1', an enabling signal 806 is generated, which allows the address 807 to be used. The address 807 is composed of the segment number 802 and the offset 803. If the bit is set to '0', an error signal is generated and sent to the requesting host. This method yields a protection mechanism which prevents hosts from reading from or writing to memory segments used by other hosts. It also provides a mechanism for access control in a shared-memory environment, where multiple hosts 401 share part of the memory space.

Figure 6:
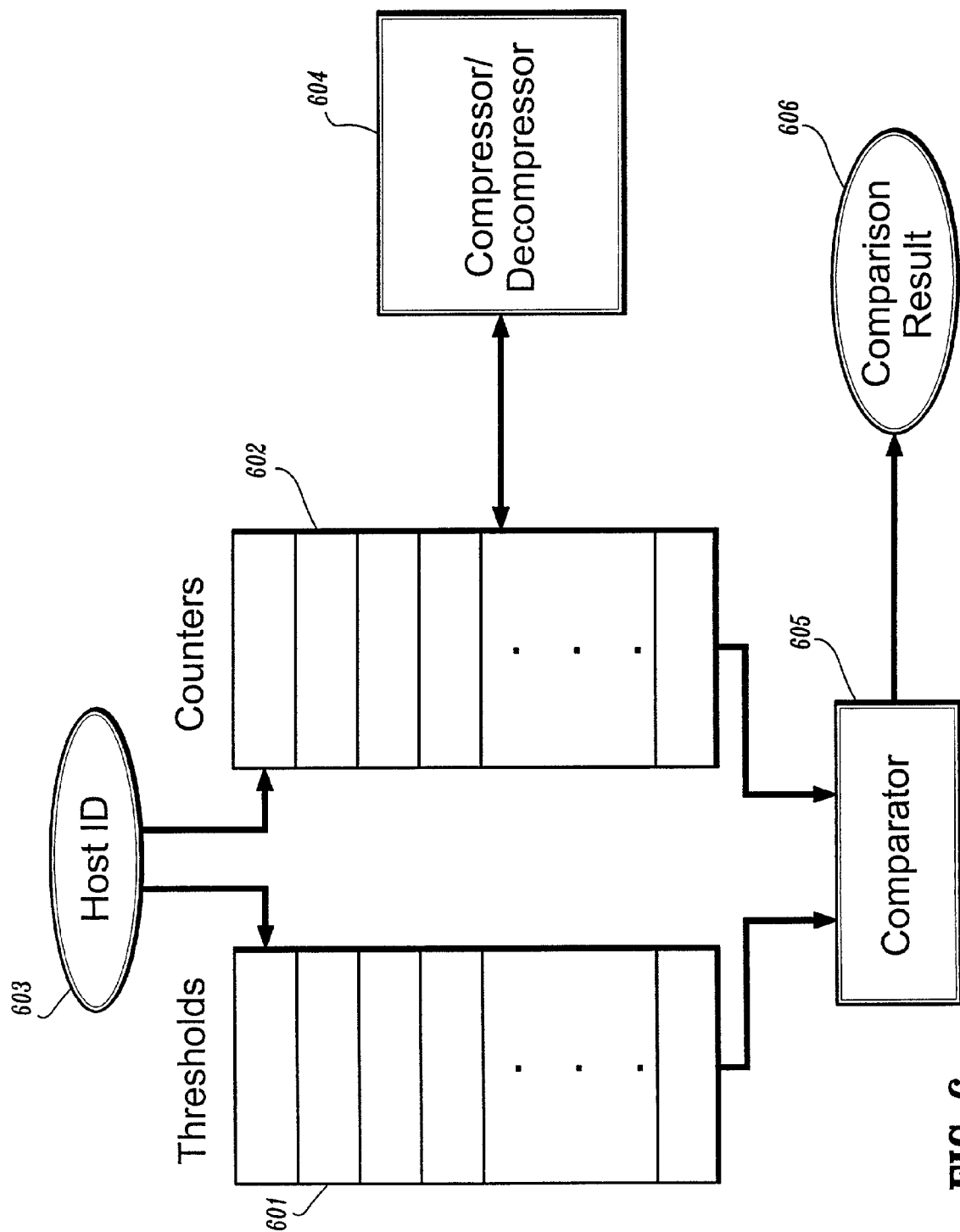
FIG. 6 illustrates the structure of the control logic used to track the number of sectors used by each host in the SCMS in accordance with the present invention.

With the method of FIG. 6, the control logic 504 would contain a counter for each host, which contains the number of segments used by the host and prevents a host from allocating more than the allowed number of segments. It would be clear to one of ordinary skill in the art how to modify the scheme of FIG. 6 to incorporate the protection mechanism of FIG. 8.

The present invention also provides a method for building a protection mechanism using the method illustrated in FIG. 7, without using the array of registers 804. If the host id part of the address, as in FIG. 7, is also provided separately as in FIG. 8 (for example, using a translation table which translates the host network address, obtained from the network adaptor, into a host id), then exclusive access to a segment is easily implemented by comparing the host id 702 of FIG. 7, which is part of the address 801, to the host id 805 of FIG. 8, which is separate from the address. If there is a mismatch, the address is invalid and an error message is generated. To support sharing of a segment, when a segment is allocated and the host id's sharing it are specified, the SCMS finds an unused entry in the rows of the translation matrix 705 corresponding to the specified hosts, and empties the entry, and copies in all the entries the address of the starting point of the allocated segment. This approach can yield a different real address for each host sharing the same sector. The SCMS control logic does not allow to write into the entries of the translation matrix 705 the starting address of a segment already in use, and therefore the described method provides the desired protection mechanism.

If the host id is not part of the address, but is provided separately, the method of FIG. 7 can be modified so that the row of the translation matrix is selected via the separately provided host id (which is now no longer part of the address 701), while the column is selected using the segment id 703. This method also automatically provides a protection mechanism, and can be used to control shared access to sectors as described in the previous paragraph.

Figure 9:
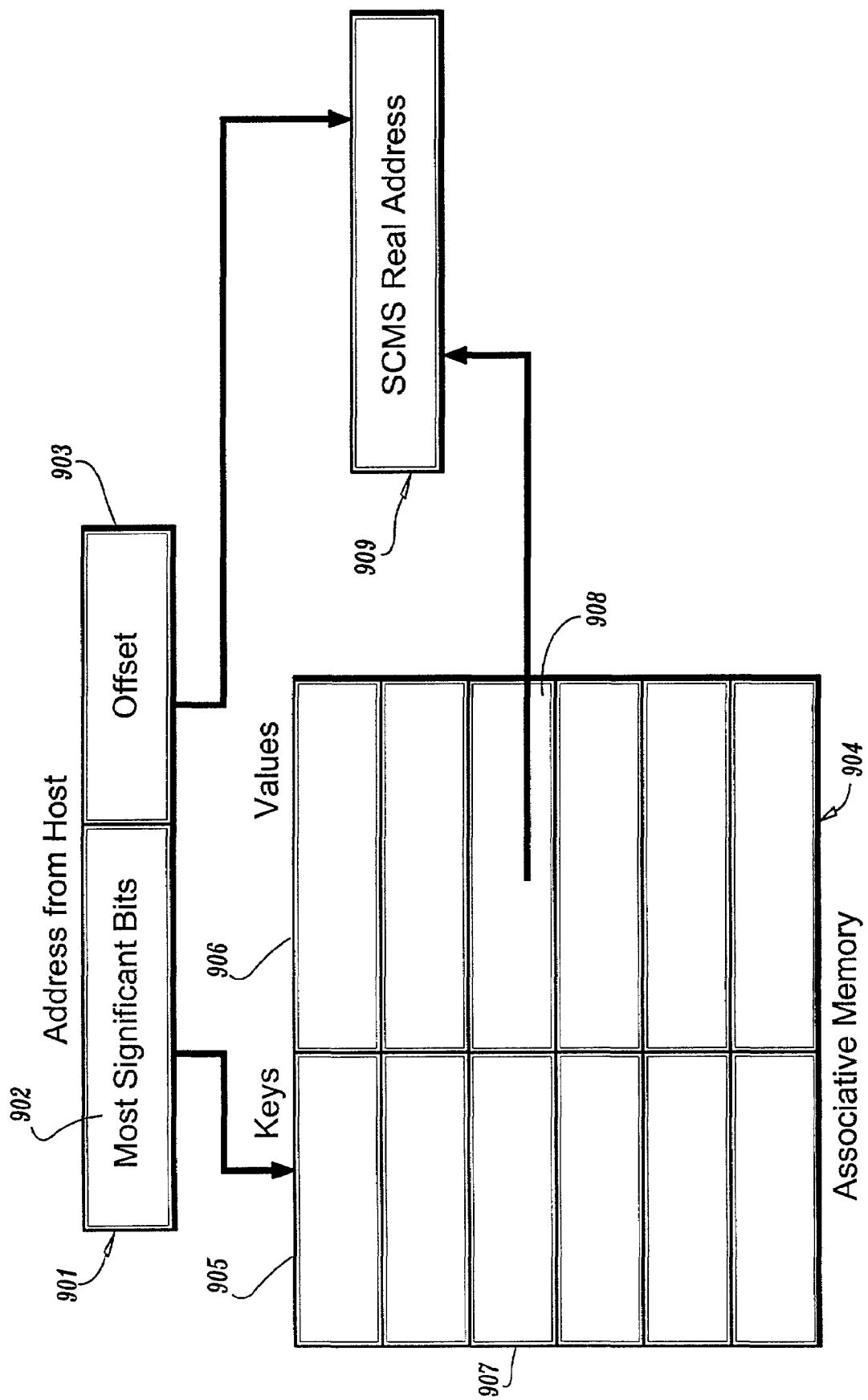
FIG. 9 illustrates a method for translating addresses from a host into real addresses as managed by the SCMS, which relies on an associative memory.

In a different embodiment, a host 401 requesting a segment also specifies the starting real address for the segment, which is aligned on segment boundaries. In this embodiment, the SCMS contains logic that ensures that the host 401 cannot allocate two different segments for which it specifies the same starting address. FIG. 9 shows the translation process between a real address provided by the host and a SCMS real address. In this case, the control logic 504 of FIG. 5 contains an associative memory 904 (data-holding location). The associative memory 904 contains one row per each managed segment (including those currently not allocated), and two columns. The first column 905 contains keys, which are the starting real addresses provided by the hosts 401 for the allocated segments. The second column 906 contains values, which are the starting real addresses of the segments in the real memory space of the SCMS.

When an address 901 is provided by a host 401, it is divided into two parts: the offset 903 within the segment, which is composed of the least significant bits, and the most significant bits 902, which are used as a search key for the associative memory 904. If one of the rows contains in the key field the same value as the search key, for example row 907, the associative memory 904 returns the content of the value field 908. Value 908 is then combined in register 909 with the offset 903, to produce the SCMS real address. It would be clear to one of ordinary skill in the art how to combine the translation mechanism of FIG. 9 with the protection mechanism of FIG. 8.

Figure 8:
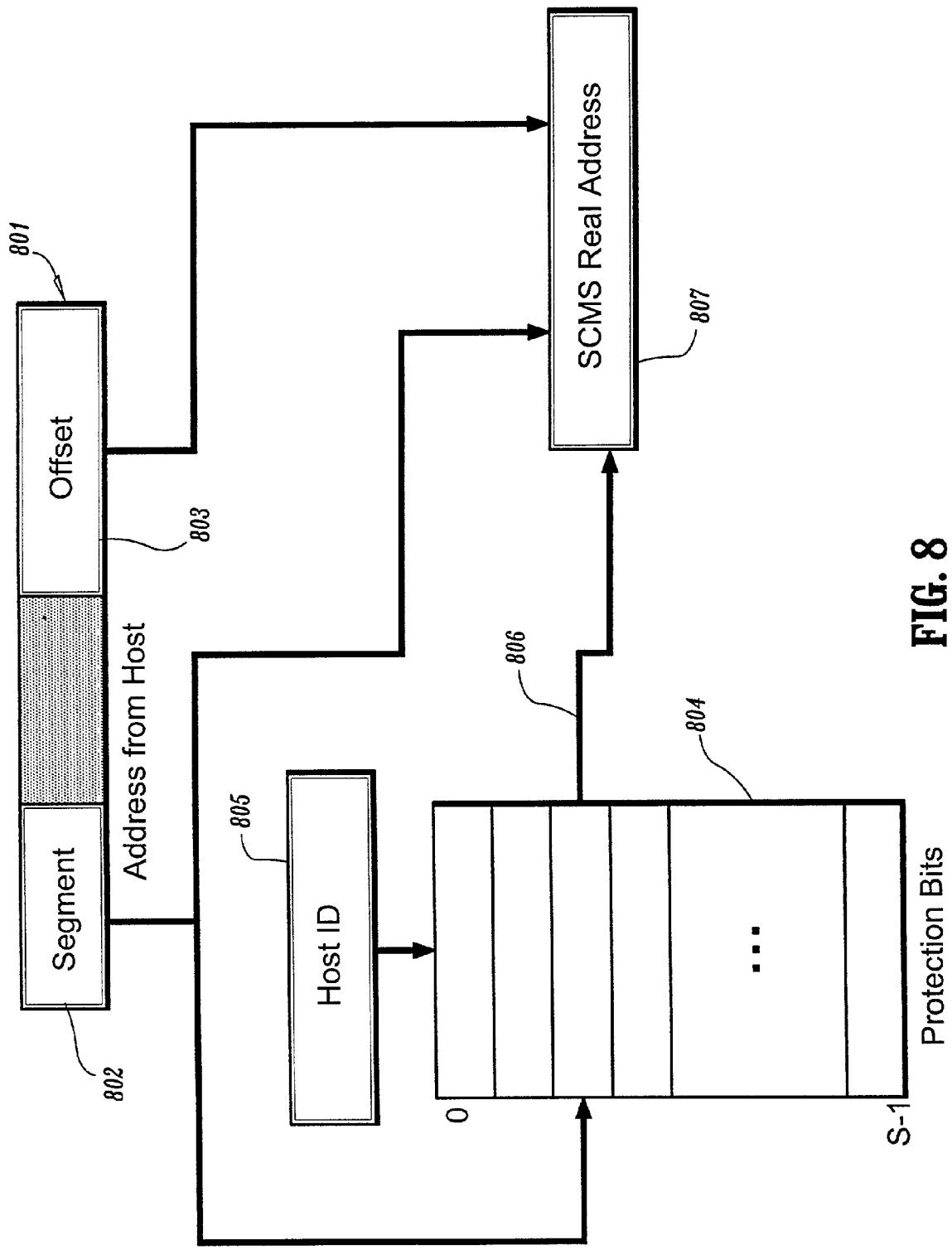
FIG. 8 illustrates a method for providing protection and controlling access to segments in the SCMS using an array of protection bits.

If the SCMS manages a large number of segments, the translation matrix 705 of FIG. 7, register 804 of FIG. 8, associative memory 904 of FIG. 9, and those derived from them as described above, would potentially be expensive to implement as registers in the control logic 504 of FIG. 5. In a preferred embodiment, the information contained in the components 705, 804, 904 is stored in the memory 502. The control logic 504 contains caches where only a subset of said information is stored, to be readily available. These caches can be managed with known cache management policies, such as maintaining in cache the most recently used segment information.

Figure 10:
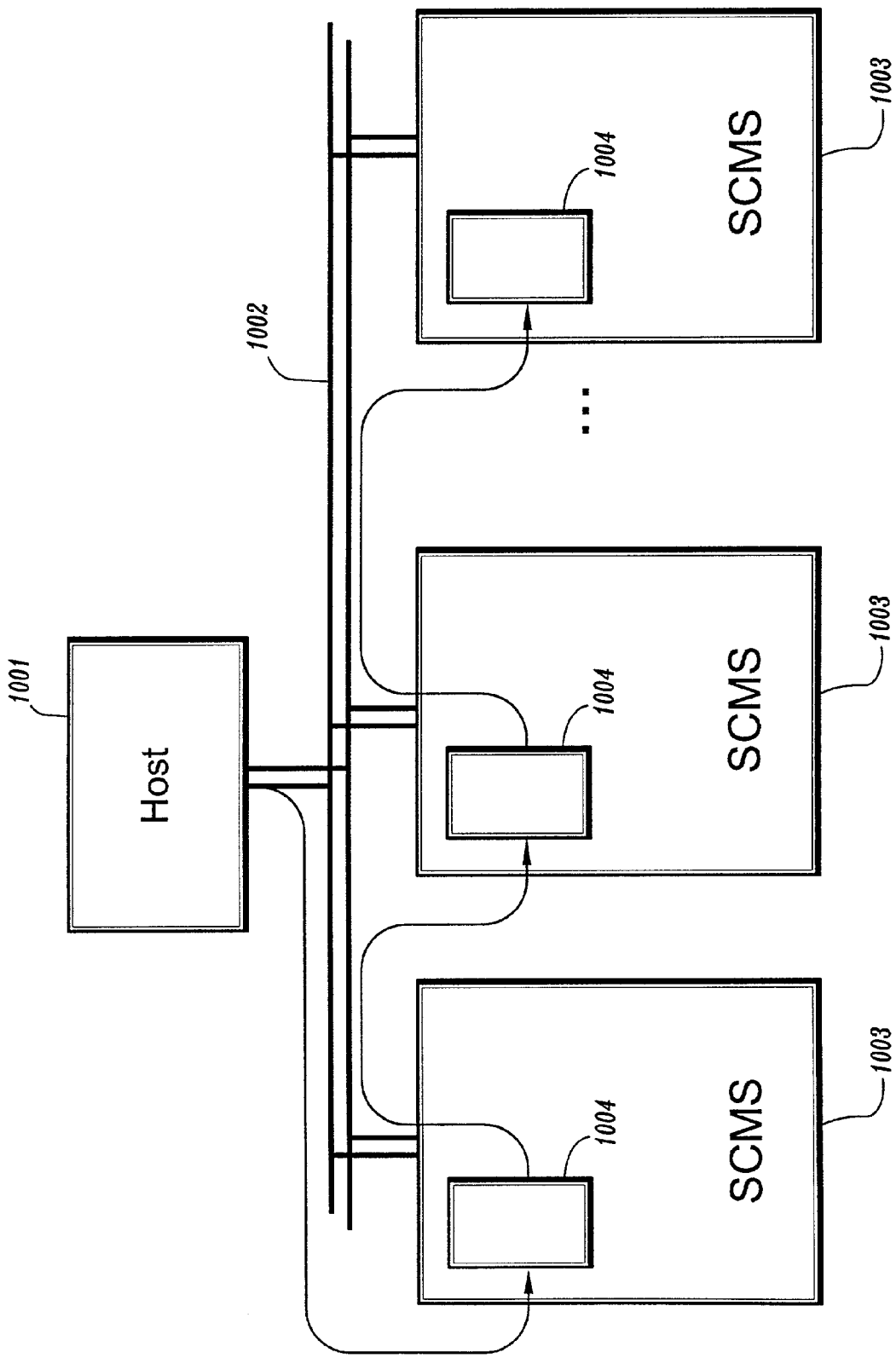
FIG. 10 illustrates an architecture of a network where part of the real address space of a host system is spread across multiple SCMSes.

The present invention also teaches how to spread the real memory space of a host across multiple SCMSes. FIG. 10 shows an example where a host 1001 is connected to multiple SCMSes 1003 through an interconnection network 1002, and where part of the real memory space of the host is spread across the SCMSes, so that each memory 1004 contains a range of real addresses. The method of FIG. 9 can be used to ensure that a contiguous subset of the real memory space of host 1001 is distributed across the SCMSes 1003.

In a preferred embodiment, a SCMS also contains information on other SCMSes connected to the same network, including, for example, their number, the address of each individual SCMS, and, for each SCMS, the number of allocated segments and compressibility information.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and micro instruction code. The various processes and functions described herein may either be part of the micro instruction code or part of the application program (or a combination thereof) which is executed via the operating system. In addition, various other peripheral devices may be connected to the computer platform, such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

Figure 11:
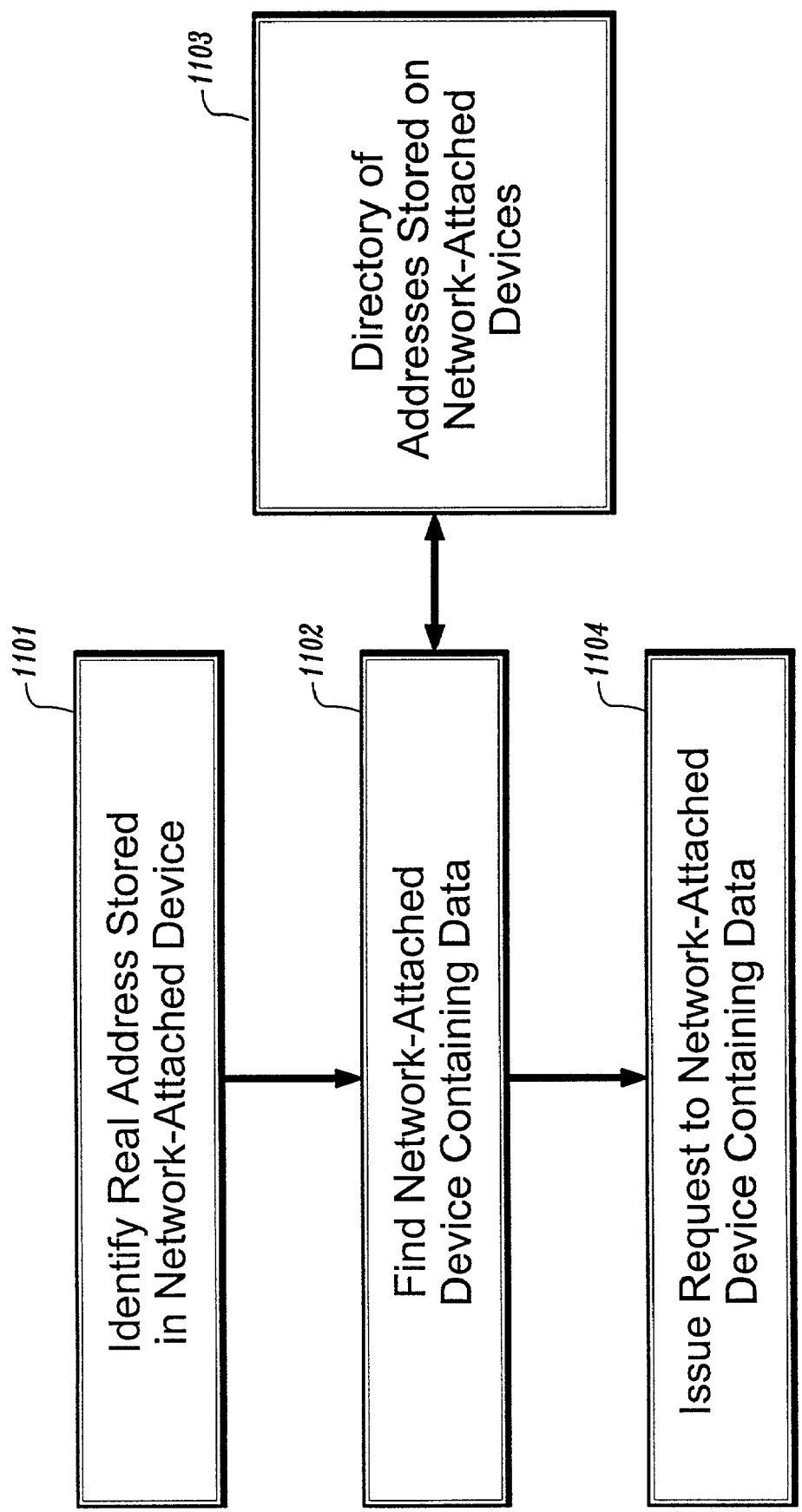
FIG. 11 illustrates a method for translating a memory reference into a request to a SCMS.

FIG. 11 illustrates how a host system would translate a memory reference into a request to a SCMS. In step 1101, the host system identifies when a real address is stored in a network-attached device. In a preferred embodiment, the logical-to-physical address translation contains provisions for identifying addresses stored in SCMSes. In this embodiment, an appropriate flag in the page table entries is used to distinguish between pages stored in the main store of the host and pages stored externally. Pages stored externally are then accessed through a driver or a hardware device that translates the memory reference to a request to the network-attached device. This translation would consist of step 1102, where the network address of the SCMS containing the data is found in a directory 1103 of addresses stored into SCMSes, and of step 1104, where the request is issued to the SCMS identified in step 1102.

In a different embodiment, pages stored in SCMSes have real addresses that do not belong to the range of real addresses supported by the memory of the host. For example, if the host does not support memory compression, the real addresses supported by the memory of the host range from zero to a maximum value equal to the physical memory size. If the host supports compression, the range of real addresses is determined by the real-to-physical translation mechanism; if said translation mechanism relies on a static directory (CTT), the range of real addresses is determined by the size of said directory. In modern operating systems, when a real address is issued outside the range of real addresses supported within the host, an exception is raised, and an interrupt is generated. In the current embodiment, the operating system module invoked when this particular interrupt is generated, contains code that perform operations 1102 and 1104.

In a further embodiment of the direct addressed Shared Compressed Memory System (SCMS) of the present invention, the SCMS includes a collection of CTTs, where each CTT corresponds to a different real address space. In this embodiment, address spaces that are not shared among hosts can be associated to at most one host. When a new host requests a non-shared address space, and real address spaces are available, the control logic of the SCMS assigns to the host an available real address space with the corresponding CTT, and associates the address space with the id of the host. When the host memory operation is directed to the SCMS, the SCMS converts the host id to the address of the corresponding CTT, and translates the real address provided by the host into physical addresses using the CTT.

Figure 12:
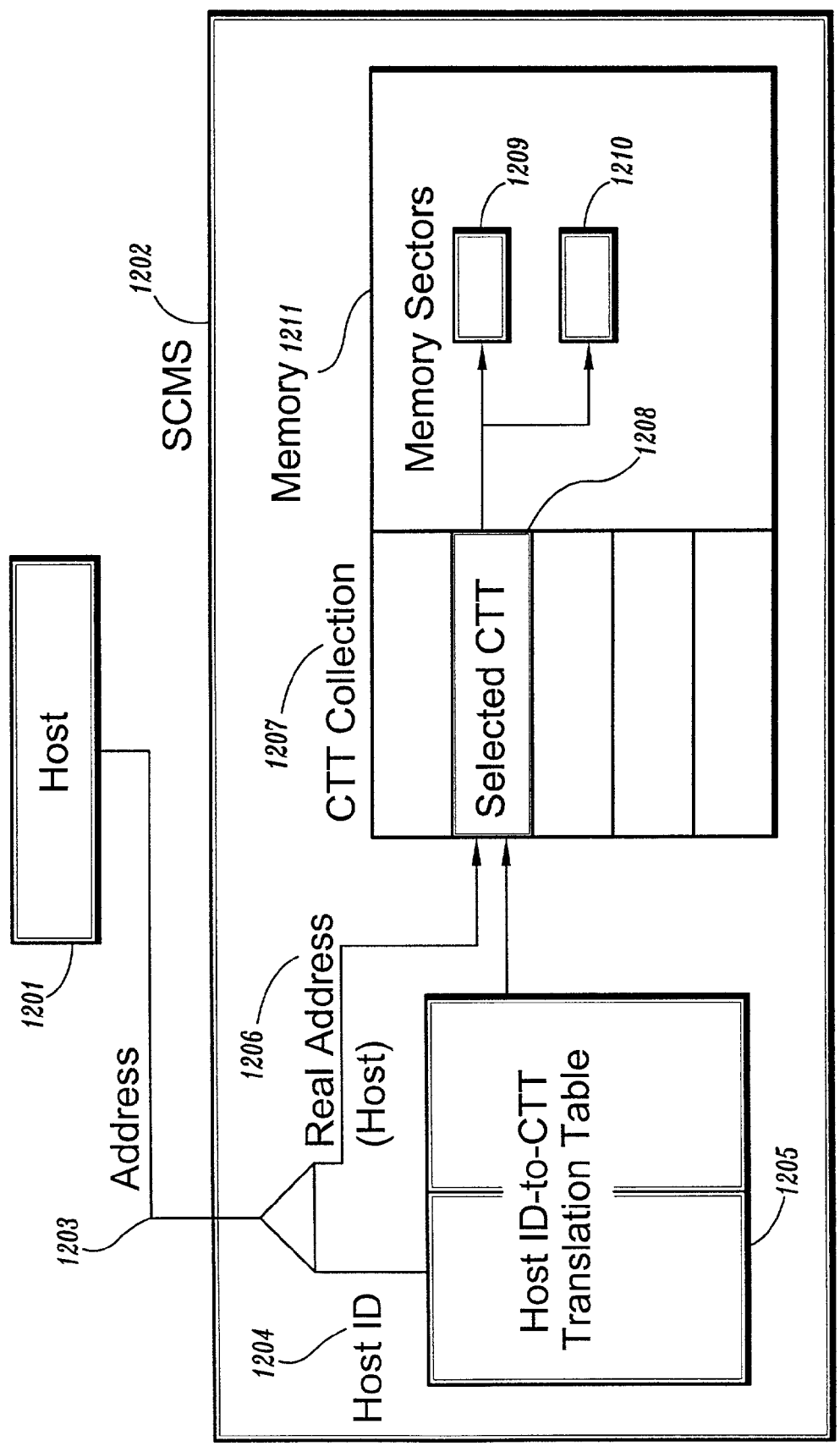
FIG. 12 illustrates an embodiment of the SCMS including a plurality of memory directories (CTTs) in accordance with the present invention.

An example of this embodiment is described with reference to FIG. 12. The SCMS 1202 includes, inter alia, a collection of CTTs 1207 and a memory 1211 further including a collection of sharable memory sectors 1209, 1210. In operation, host 1201 issues a memory operation to the SCMS 1202, and sends an address 1203. The SCMS retrieves host id 1204 and real address 1206 generated by the host from address 1203. The host id 1204 is then used to select a CTT from the collection of CTTs 1207 using a host id-to-CTT translation table 1205. Using the host id-to-CTT translation table 1205, the SCMS selects a CTT 1208 associated with the host 1201. The selected CTT 1208 is used to translate the real address generated by the host 1206 into physical addresses containing the corresponding data.

In the example, the memory line containing the address 1206 is stored using two memory sectors 1209 and 1210.

One of ordinary skill in the art would appreciate how to combine the other features of the present invention previously described with the present feature. For example, the SCMS can allow multiple hosts to share the same segment associated with one of the CTTs in the CTT collection 1207 by allowing the mapping between host ids and CTTs to be a many-to-one mapping. In this case, multiple host ids are mapped using the host-id-to-CTT translation table by mapping multiple host ids into a single CTT. One of ordinary skills in the art would appreciate how the policies controlling the physical amount of memory used by a single segment, the additional translations between addresses generated by the host and real addresses within a segment, etc., also apply to the present feature of the invention.

While the invention has been shown and described with reference to certain preferred embodiments thereof, it will be understood by those skilled in the art that various changes in form and detail may be made therein without departing from the spirit and scope of the invention as defined by the appended claims.

What is claimed is:

1. In a computer system in which a plurality of hosts is connected through an interconnection network, each host having an associated real address space, an apparatus coupled to the interconnection network for allowing the plurality of hosts to share a collection of memory sectors, the memory sectors storing compressed data, the apparatus comprising:
   a network adapter for coupling the apparatus to the interconnection network;
   a memory for storing the collection of memory sectors, the memory including a directory for translating real addresses of at least one host to an address in the apparatus where compressed data is stored;
   control logic for managing the memory, the control logic including a memory compressor/decompressor; and
   a set of registers, the set of registers including a plurality of threshold registers for storing a maximum number of sectors granted to each host and a plurality of counter registers for storing a number of sectors used by each host.

2. The apparatus of claim 1, further comprising a tertiary store.

3. The apparatus as in claim 1, wherein the memory further comprises a directly mapped area and an uncompressed area.

4. The apparatus as in claim 1, further comprising a comparator for comparing a value of the threshold register of at least one host to a value of the counter register of the at least one host to determine if the value of the counter register has exceeded the threshold register.

5. The apparatus as in claim 1, wherein the real address of the at least one host comprises an id of the at least one host, a desired memory segment of the apparatus and an offset of the desired segment.

6. The apparatus as in claim 5, wherein the real address further comprises allocated segments in different apparatuses.

7. The apparatus as in claim 5, wherein the control logic further comprises a matrix of registers, each row of the matrix corresponding to a different host id and each column corresponding to a different segment number whereby contents of a specific register determined by the id of the at least one host and desired memory segment is concatenated to the offset resulting in the real address as managed by the apparatus.

8. The apparatus as in claim 1, wherein the control logic further comprises an array of registers, the array including a number of registers corresponding to a number of memory segments of the apparatus, wherein each register comprises one bit for each supported host, whereby if the one bit is equal to 1, a desired memory segment is concatenated to the offset resulting in the real address as managed by the apparatus, and if the one bit is equal to 0, the at least one host being denied access to the segment.

9. The apparatus as in claim 1, wherein the control logic further comprises an associative memory including one row for each managed memory segment of the apparatus, a first column including keys and a second column including values, wherein the keys are starting real addresses provided by the plurality of hosts for desired memory segments and the values are starting real addresses of segments in the apparatus whereby a value determined by a search key of the at least one host is concatenated to the offset resulting in the real address as managed by the apparatus.

10. The apparatus as in claim 1, wherein the computer system further comprises a plurality of apparatuses, the apparatus containing information of the other apparatuses such as the number of apparatuses, an address of each of the plurality of apparatuses, a number of allocated segments to each of the plurality of apparatuses and compressibility of data stored.

11. The apparatus as in claim 1, wherein the memory further comprises a plurality of directories, each directory corresponding to a different real address space of each host of the plurality of hosts.

12. The apparatus as in claim 11, wherein the memory further comprises a host id-to-directory translation table, wherein a host id generated by at least one host is used to select a directory of the plurality of directories corresponding to the at least one host, the directory translating a real address of the at least one host into a physical address of the apparatus.

13. In a computer system in which a plurality of hosts is connected through an interconnection network including an apparatus coupled to the interconnection network for allowing the plurality of hosts to share a collection of memory sectors, the memory sectors storing compressed data, a method for managing a number of memory sectors used by each host, the method comprising the steps of:
   determining a maximum number of sectors to be granted to each host;
   allocating to at least one host a threshold register for storing a maximum number of sectors granted to the at least one host;
   allocating to the at least one host a counter register for storing a number of sectors used by the at least one host; and
   comparing a value of the threshold register of the at least one host to a value of the counter register of the at least one host to determine if the value of the counter register has exceeded the threshold register.

14. The method as in claim 13, further comprising the step of selecting the associated threshold register and counter register of the at least one host by an id of the at least one host.

15. The method as in claim 13, further comprising the step of, when the at least one host performs a release operation, decrementing the counter register by a number of sectors used by a set of real addresses released by the at least one host.

16. The method as in claim 13, further comprising the step of, if the value of the counter register has exceeded the threshold register, signaling the at least one host its number of used sectors has exceeded its number of granted sectors.

17. The method as in claim 13, further comprising the step of, if the value of the counter register has exceeded the threshold register, reducing the number of sectors used by the at least one host.

18. The method as claim 13, further comprising the steps of, when the at least one host performs a write operation, compressing memory lines to be written and incrementing the counter register by a number of sectors used by the memory lines.

19. The method as in claim 18, further comprising the step of, if the value of the counter register has exceeded the threshold register, preventing the write operation by the at least one host.

20. The method as in claim 19, further comprising the step of notifying the at least one host the write operation failed.

21. In a computer system in which a plurality of hosts is connected through an interconnection network including an apparatus coupled to the interconnection network for allowing the plurality of hosts to share a collection of memory sectors, the memory sectors storing compressed data, a method for translating a real address specified by at least one host into a real address of the apparatus, the method comprising the steps of:
    requesting by the at least one host a desired real address of the apparatus using a host-specified real address;
    identifying a data-holding location in the apparatus using the host-specified real address;
    determining a first value using contents of the data holding location; and
    concatenating the first value to an offset resulting in the real address of the apparatus;
    wherein the data holding location is a matrix of registers, each row of the matrix corresponding to a different host id of the at least one host and each column corresponding to a different segment number.

22. The method as in claim 21, further comprising the step of decomposing the host-specified real address into a host id, a segment number, and the offset.

23. The method as in claim 21, wherein the identifying step further comprises identifying a register in the matrix by selecting a row of the matrix using the host id of the at least one host and selecting a column of the matrix using the segment number.

24. The method as in claim 23, wherein the determining step further comprises providing the contents of the identified register as the first value.

25. The method as in claim 21, wherein the data holding location is an array of registers, the array including a number of registers corresponding to a number of segments of the apparatus.

26. The method as in claim 25, wherein each register comprises one bit for each supported host, the bits being set to 1 if the supported host is allowed access to the segment and the bits being set to 0 if the supported host is not allowed access to the segment.

27. The method as in claim 26, wherein the identifying step further comprises identifying a register of the array corresponding to a segment number extracted from the host-specified real address.

28. The method as in claim 27, wherein the determining step further comprises the steps of:
    checking the one bit in the identified register corresponding to a host id provided by the at least one host; and
    if the one bit equals 1, providing the segment number as the first value.

29. The method as in claim 27, wherein the determining step further comprises the step of:
    checking the one bit in the identified register corresponding to a host id provided by the at least one host; and
    if the one bit equals 0, generating an error signal which is sent to the at least one host indicating the segment is not accessible.

30. The method as in claim 21, wherein the data holding location is an associative memory including one row for each managed segment of the apparatus, a first column including keys and a second column including second values, wherein the keys are starting real addresses provided by the plurality of hosts for desired segments and the second values are starting real addresses of the segments in the apparatus.

31. The method as in claim 30, further comprising the step of decomposing the host-specified address into a search key and the offset.

32. The method as in claim 31, wherein the identifying step further comprises identifying a row of the associative memory using the search key of the at least one host.

33. The method as in claim 32, wherein the determining step further comprises providing the second value corresponding to the identified row as the first value.

34. In a computer system in which a plurality of hosts is connected through an interconnection network including an apparatus coupled to the interconnection network for allowing the plurality of hosts to share a collection of memory sectors, the memory sectors storing compressed data, a program storage device readable by machine, tangibly embodying a program of instructions executable by the machine to perform method steps for managing a number of memory sectors used by each host, the method steps comprising:
    determining a maximum number of sectors to be granted to each host;
    allocating to at least one host a threshold register for storing a maximum number of sectors granted to the at least one host;
    allocating to the at least one host a counter register for storing a number of sectors used by the at least one host; and
    comparing a value of the threshold register of the at least one host to a value of the counter register of the at least one host to determine if the value of the counter register has exceeded the threshold register, wherein if the value of the counter register has exceeded the threshold register, denying a write operation of the at least one host.

35. In a computer system in which a plurality of hosts is connected through an interconnection network including an apparatus coupled to the interconnection network for allowing the plurality of hosts to share a collection of memory sectors, the memory sectors storing compressed data, a program storage device readable by machine, tangibly embodying a program of instructions executable by the machine to perform method steps for translating a real address specified by at least one host into a real address of the apparatus, the method steps comprising:
    requesting by the at least one host a desired real address of the apparatus using a host-specified real address;

identifying a data holding location in the apparatus using the host-specified real address;
determining a first value using contents of the data holding location; and
concatenating the first value to an offset resulting in the real address of the apparatus;
wherein the data holding location is a matrix of registers, each row of the matrix corresponding to a different host id of the at least one host and each column corresponding to a different segment number.

* * * * *